United States Patent [19]
Estep

[11] Patent Number: 5,879,024
[45] Date of Patent: Mar. 9, 1999

[54] AIR BAG DEPLOYMENT INHIBITOR CIRCUIT

[76] Inventor: William Estep, P.O. Box 314, Powellton, W. Va. 25161

[21] Appl. No.: 87,965

[22] Filed: Jun. 1, 1998

[51] Int. Cl.$^6$ .................................................... B60R 21/32
[52] U.S. Cl. ........................ 280/735; 116/28 R; 116/202; 340/436; 340/457.1; 340/459
[58] Field of Search ...................................... 280/734, 735; 340/425.5, 436, 438, 457.1, 458, 459, 461; 116/2, 28 R, 202

[56] References Cited

U.S. PATENT DOCUMENTS

| | | |
|---|---|---|
| 3,112,467 | 11/1963 | Benning . |
| 5,482,314 | 1/1996 | Corrado et al. . |
| 5,506,775 | 4/1996 | Tsurushima et al. . |
| 5,544,914 | 8/1996 | Borninski et al. . |
| 5,590,904 | 1/1997 | Ellis et al. . |
| 5,629,847 | 5/1997 | Shirakawa et al. . |
| 5,631,834 | 5/1997 | Tsurushima et al. . |
| 5,638,274 | 6/1997 | Konishi et al. . |
| 5,653,462 | 8/1997 | Breed et al. . |
| 5,668,528 | 9/1997 | Kitao et al. . |

FOREIGN PATENT DOCUMENTS

| | | | |
|---|---|---|---|
| 4410402 | 9/1994 | Germany | 280/735 |
| 6-219236 | 8/1994 | Japan | 280/734 |

*Primary Examiner*—Eric Culbreth
*Attorney, Agent, or Firm*—Richard C. Litman

[57] ABSTRACT

The air bag deployment inhibitor circuit is a fail-safe type of circuit inserted between the power source and the squib which actuates the air bag inflator. The circuit has a normally closed seat adjustment limit switch and a seat belt switch normally open when the seat belt is properly buckled. The seat belt switch is in series with the coil of a relay. Both the seat adjustment limit switch and the contacts of the relay are in series between the power source and the squib, so that if either the seat adjustment switch is open, or the seat belt is unbuckled, opening the relay contacts, the air bag is deactivated and will not deploy. The circuit may include either one indicator light or LED to show the air bag is enabled, or a separate indicator for each switch to indicate the reason why the air bag is not enabled.

13 Claims, 2 Drawing Sheets

AIR BAG DEPLOYMENT INHIBITOR CIRCUIT

BACKGROUND OF THE INVENTION

1. Field of the Invention

The present invention relates to motor vehicle safety apparatus, and particularly to devices which prevent deployment of an air bag relative to out-of-position occupants in order to prevent serious or fatal injury to such occupant of the vehicle.

2. Description of the Related Art

Over the years many safety devices have been developed to reduce the number of fatalities and serious injuries resulting from motor vehicle accidents. The seat belt marked a major milestone in the development of vehicular safety devices, but because of perceived inadequacies in the use of seat belts alone, the trend in the current decade has been towards supplementing seat belts with air bags. While air bags have been credited with saving lives, air bags have also been implicated as the cause of many serious injuries and deaths.

Among other problems with air bags, they may deploy when the occupant of the seat is too far forward, and hence too close to the air bag cover and air bag, either through the explosive force resulting from the rapid inflation and deployment (an air bag can inflate in milliseconds) of the air bag, or through a smothering effect. Air bags have traditionally been designed based upon the position of the average male relative to the steering wheel of the vehicle. Individuals who are shorter than average, or who have shorter legs, may actually adjust the seat to sit farther forward, while taller individuals, or those with longer legs, may adjust the seat to sit farther back, so that the driver's actual sitting position may vary from six to twelve inches closer or farther to the steering wheel than the average male. Similar considerations may apply to the occupant of the passenger's seat.

A complicating factor is the use of seat belts, which is highly recommended with the use of air bags. Older seat belts consisted of a strap which buckled around the waist of the occupant of the seat. Modern seat belts are supplements with a shoulder harness and a pretensioner system which automatically pulls the occupant back in the seat in the event of a collision. If, however, the occupant is not wearing a seat belt, the occupant may be thrown far forward before the air bag receives the appropriate signal to deploy from a crash sensor, leaving the occupant to be buffeted between the force of the crash snapping him forward, and the force of the air bag exploding as it inflates to force him backwards, potentially whipping the neck and spinal column.

Several devices have been designed to help deal with these problems and to improve air bags generally. One approach has been to equip the air bags with a manual switch, leaving the occupant of the vehicle's seat to determine whether to leave the air bag activated. An example of this approach is shown in U.S. Pat. No. 5,544,914, issued Aug. 13, 1996 to Borninski, et al. Borninski shows a circuit to manually disable the air bag with a key switch. A second approach is exemplified by sensor circuits designed to automatically deactivate the air bag based upon electronic sensing of the occupant's seat position. An example of this type of apparatus is described in U.S. Pat. No. 5,653,462, issued Aug. 5, 1997 to Breed, et al. The Breed Patent describes the use of ultrasonic, electromagnetic, and infrared sensors to detect the position of the occupant relative to the seat Breed's apparates includes a device for sensing the seat position by a potentiometer with a sliding brush attached to the seat track to prevent deployment of the air bag if the seat is too far forward.

A similar system for sensor detection of passenger occupancy and position employing a combination of thermal and acoustic or ultrasound sensors generating signals which are fused and evaluated by a probability algorithm is disclosed in U.S. Pat. No. 5,482,314, issued Jan. 9, 1996 to Corrado, et al.

A slightly different system for linking deployment of the air bag to the status of the seat belt is described in U.S. Pat. No. 5,590,904, issued Jan. 7, 1997 to Ellis, et al. The Ellis patent shows a seat belt buckle switch connected to a resistor network sending a first signal to a microprocessor controller if the buckle switch is closed and a second signal if the buckle is open. The controller evaluates whether to deploy the air bag basted upon the state of the signal.

Various circuits for determining that the air bag should be deployed are described in U.S. Pat. No. 5,629,847, issued May 13, 1997 to Shirakawa, et al. (system evaluates two acceleration signals, or acceleration and deceleration signals, to evaluate whether to deploy air bag) and U.S. Pat. No. 5,631,834, issued May 20, 1997 to Tsurushima, et al. (control circuit for judging the magnitude of a collision, connecting a power source to an igniting device to activate the air bag).

Devices to prevent the air bag circuitry from malfunctioning include U.S. Pat. No. 5,506,775, issued Apr. 9, 1996 to Tsurushima, et al. (power source circuit for boosting the battery voltage used to charge the capacitor which ignites the squibs in the event of an accident); U.S. Pat. No. 5,638,274, issued Jun. 10, 1997 to Konishi, et al. (circuit for preventing reset of charging circuit for a back-up power capacitor due to electrical noise, ensuring the capacitor will only be charged when the ignition switch is turned on); and U.S. Pat. No. 5,668,52, issued Sep. 16, 1997 to Kitao (a device which includes a series circuit of squibs connected by bridge wires which ignites the squibs so quickly the air bags will deploy even if a squib opens to create an open circuit). The Kitao patent also includes a device to indicate whether a passenger is present, either means for judging whether the seat belt is locked, a manually operated switch, or a photoelectric, ultrasonic or pressure sensor.

The device of the present invention adds a circuit, or portion of a circuit, between the power source and the squib which activates the inflator to inflate the air bag. The circuit includes a seat adjustment limit switch and a seat belt switch in series with the power source and the squib, so that if the seat is adjusted too far forward, or if the seat belt is unbuckled, the air bag will not deploy.

The Ellis patent, while it deactivates the air bag if the seat belt is unbuckled, makes no provision for preventing deployment if the seat is too far forward. The Breed patent, while it disables the air bag if the seat is too far forward, makes no provision for the unbuckled seat belt. Both devices rely on complicated circuitry with microprocessor evaluation processes, while the device of the present invention operates in a fail-safe manner after the fashion of a circuit breaker.

None of the above inventions and patents, taken either singularly or in combination, is seen to describe the instant invention as claimed. Thus air bag deployment inhibitors solving the aforementioned problems are desired.

SUMMARY OF THE INVENTION

The air bag deployment inhibitor circuit is a fail-safe type of circuit inserted between the power source and the squib which actuates the air bag inflator. The circuit has a normally closed seat adjustment limit switch and a seat belt switch normally open when the seat belt is properly buckled. The seat belt switch is in series with the coil of a relay. Both the seat adjustment limit switch and the contacts of the relay are in series between the power source and the squib, so that if either the seat adjustment switch is open, or the seat belt is unbuckled, opening the relay contacts, the air bag is deactivated and will not deploy. The circuit may include either one indicator light or LED to show the air bag is enabled, or a separate indicator for each switch to indicate the reason why the air bag is not enabled.

Accordingly, it is a principal object of the invention to prevent deployment of an air bag when the seat of the motor vehicle is adjusted too far forward by inserting a limit switch between the power source and the squib that actuates the air bag inflator, the limit switch opening the circuit automatically when the seat is too far forward in order to prevent injury to the occupant of the seat.

It is another object of the invention to prevent deployment of an air bag when the seat belt of the motor vehicle is unbuckled by inserting a seat belt switch between the power source and the squib that actuates the air bag inflator, the seat belt switch opening the circuit automatically when the seat belt is unbuckled in order to prevent injury to the occupant of the seat.

It is a further object of the invention to provide a visible means of indicating to the occupant of the seat when the air bag is deactivated due to improper seat adjustment or failure to buckle the seat belt.

Still another object of the invention is to provide an economical means of preventing injury to the occupant of a motor vehicle from deployment of an air bag when the occupant of the seat is too far forward which operates before the collision occurs, thus precluding air bag injury when a collision occurs.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

Figure 1:
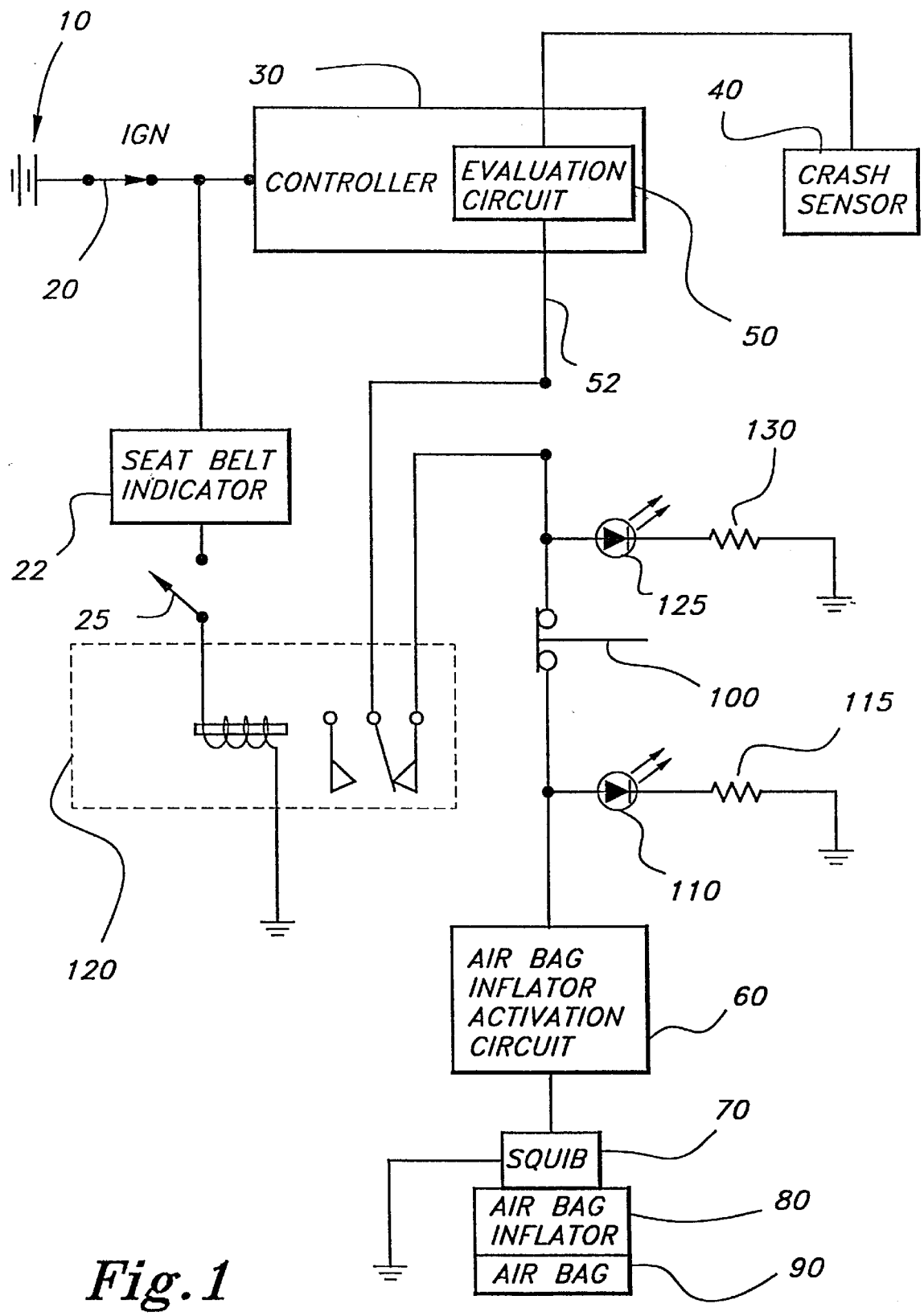
FIG. 1 is a schematic diagram of the air bag deployment inhibitor circuit according to the present invention.

The present invention will now be described by reference to the schematic diagrams shown in FIGS. 1 and 2. FIG. 2 shows the basic circuit diagram of an air bag deployment system according to the prior art. The battery 10 of the automobile is connected to a controller 30 through the ignition switch 20. The controller 30 is usually a microprocessor and related circuitry. A crash sensor 40 inputs data to an evaluation circuit 50, which may be integral with the controller 30 or may be a discrete circuit board and components. Although a single crash sensor 40, which may be an acceleration sensor or other device well known in the art providing warning of an impending collision, is shown in the schematic, it will be understood that the circuit may contain a plurality of crash sensors. The evaluation circuit 50 makes a decision to deploy the air bag 90, usually by evaluating an algorithm or series of algorithms.

When the evaluation circuit 50 decides that the air bag 90 should be deployed, an appropriate signal is sent to an air bag inflator actuation circuit 60 via wire 52. It will be understood that the signals input to and output from the controller 30 are typically on the order of milliamperes. Upon receiving a signal to deploy the air bag 90, the air bag inflator actuation circuit 60 will send a current on the order of about 5 amperes to the squib 70, igniting the squib 70 to activate the air bag inflator 80 and inflating the air bag 90. The circuit inflating the air bag is connected to ground at squib 70.

Typically, the vehicle will contain a seat belt indicator 22 in the form of an indicator light on the dashboard and/or a buzzer which is activated for a timed interval when the key is inserted in the ignition switch 20 and turned on with the seat belt unbuckled. The seat belt indicator is connected to the battery 10 through the ignition switch 20, and to ground through a seat belt switch 25 which is normally closed when the seat belt is unbuckled. Buckling the seat belt opens seat belt switch 25, opening the circuit and turning the indicator off.

Figure 2:
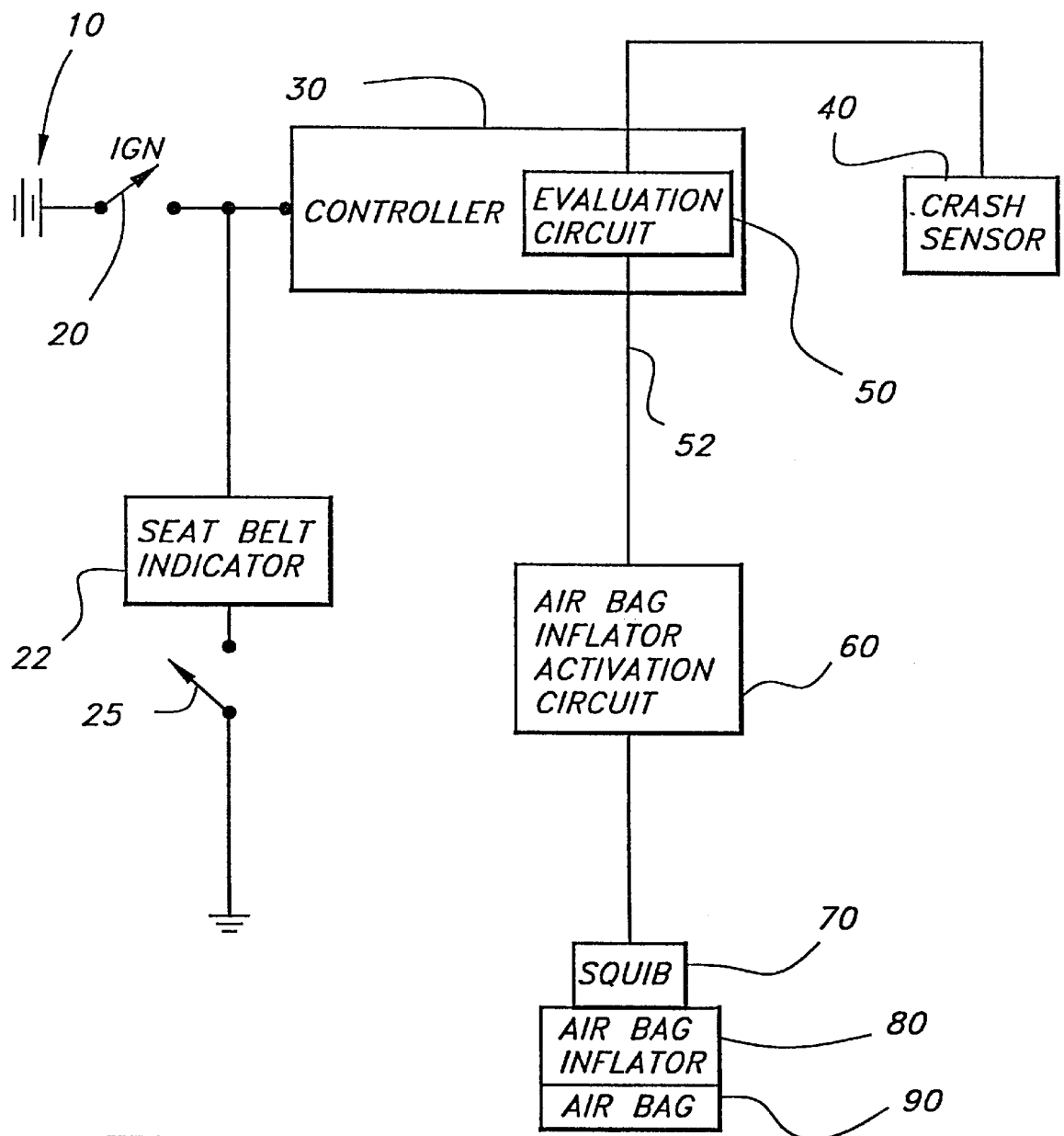
FIG. 2 is a schematic drawing of an air bag deployment system according to the prior art. Similar reference characters denote corresponding features consistently throughout the attached drawings.

FIG. 1 shows the air bag deployment inhibitor circuit according to the present invention. Electrically, the circuit is inserted between the ignition switch 20 and the squib 70, and more particularly between the evaluation circuit 50 or controller 30 and the air bag inflator actuation circuit 60. The circuit includes a seat adjustment limit switch 100 and a seat adjustment indicator, illustrated in the drawing as a visible LED 110 with its current limiting resistor 115 connected to ground. Seat belt limit switch 100 is a normally closed switch in series between the evaluation circuit 50 and the air bag inflator actuation circuit 60. Physically the switch is attached to the vehicle at the seat adjustment track so that the switch is closed when the seat is adjusted towards the rear of the vehicle and is open when the track is adjusted too far forward.

Limit switches are well known in the electrical arts and appear in a variety of forms, including toggle, push button, sliding, etc. The exact type or form of limit switch 100 is not critical, provided the switch closes and opens according to the position of the seat as set forth in the preceding paragraph. The exact physical positioning of the switch 100 may vary from vehicle to vehicle, depending on the thickness of the air bag and the position of the seat track and seat relative to the front of the fully inflated air bag.

The seat adjustment indicator is shown in FIG. 1 as a visible LED, which is mounted on the dashboard in the view of the occupant of the seat. It will be readily apparent that the seat adjustment indicator may also be in the form of a light bulb replacing LED 110 and resistor 115.

The circuit also includes a relay 120, shown with single pole double throw contacts. The coil of the relay 120 is connected between the pole of seat belt switch 25 and ground. The pole and one of the contacts are connected in wire 52 in series between the evaluation circuit 50 or controller 30 and the air bag inflator actuation circuit 60. The other contact is not electrically connected to the circuit. The contacts are configured so that when the seat belt switch 25 is closed (seat belt unbuckled), current flows through the coil and pulls the leaf or armature of the relay 120 into electrical connection with the contact unconnected to the circuit, creating an open in the circuit path between the controller 30 and the air bag inflator actuation circuit 60. When the seat belt switch 25 is open, no current flows through the coil, and the leaf or armature of relay 120 springs back into electrical contact in the series circuit, closing the circuit between controller 30 and air bag inflator activation circuit 60.

The circuit includes a buckle indicator in the form of visible LED 125 connected to ground through current limiting resistor 130. It will be apparent that, as with indicator LED 110, LED 125 and resistor 130 may be replaced by a light bulb. Physically, LED 125 is positioned adjacent LED 110 on the dash in a position visible to the occupant of the seat.

In operation, when the ignition switch 20 and the seat belt unbuckled, seat belt switch 25 is closed and the circuit is connected to ground through the coil of relay 120, so the seat belt indicator 22 turns on, while the relay 120 contacts leave an open in the circuit between the controller 30 and LED 125, leaving the air bag deactivated so it will not deploy. When the seat belt is buckled, seat belt switch 25 opens. No current flows through the coil of relay 120, closing the contacts and closing the circuit between the controller 30 and LED 125. The indicator LED 125 now has a complete path to the supply voltage, and the LED 125 turns on, giving the vehicle occupant a visual signal that the air bag 90 has not been disabled for failure to buckle the seat belt.

The seat adjustment limit switch 100 will be open or closed depending on the position of the seat on the seat tracks. Normally, with the seat positioned far enough to the rear to avoid injury to the occupant from sudden inflation of the air bag 90, the limit switch 100 is in a closed position, resulting in a closed circuit in which an air bag activation signal can travel from the controller 30 through wire 52 to the air bag inflator activation circuit 60, igniting squib 70 and triggering the air bag inflator 80 to inflate air bag 90. Also, LED 110 turns on, giving the occupant of the seat a visual signal that the air bag 90 is activated. When the seat position is moved too far forward, creating a risk of injury to the occupant of the vehicle if the air bag is deployed, the limit switch 100 opens, breaking the circuit path to the air bag inflator activation circuit 60, disabling the air bag 90 and turning indicator LED 110 off, signaling the. occupant of the seat that the air bag 90 is disabled because the seat is too far forward.

Although a single circuit is shown in FIG. 1, it will be apparent that the circuit will be duplicated for each vehicle seat equipped with an air bag 90, so that both driver and passenger are protected individually by the inhibitor circuit.

Hence, the air bag deployment inhibitor circuit provides a fail safe method of disabling or deactivating the air bag 90 when either the seat belt is unbuckled or the seat position is adjusted too far forward, in order to prevent injuries caused by the rapid inflation of the air bag 90 in situations where there is a great risk that the occupant of the seat may be injured by being too close to the air bag 90. While not a comprehensive solution to air bag safety problems, the circuit provides an economical fail-safe solution for limiting situations.

It is to be understood that the present invention is not limited to the embodiments described above, but encompasses any and all embodiments within the scope of the following claims. It will particularly be understood that the seat adjustment limit switch 100 may be enabled separately by removing relay 120, LED 125, and resistor 130 from the circuit, or the seat belt switch may be enabled separately by removing limit switch 100, LED 110, and resistor 115 from the circuit. It will also be understood that the dual indicator system may be turned into a single visual indicator to signify that the air bag 90 has not been disabled by removing LED 125 and resistor 130 from the circuit.

I claim:

1. An air bag deployment inhibitor circuit for a motor vehicle having an ignition switch connected between a battery and a controller, a crash sensor connected to an evaluation circuit sending an electrical signal warning of a collision to the controller, circuitry inflating an air bag on receipt of a signal from the controller, a seat whose position is adjustable on a seat track, and a seat belt buckle switch having electrically closed contacts when the seat belt is unbuckled and open contacts when the seat belt is buckled, comprising buckle inhibiting means for opening the circuit between the controller and the circuitry inflating the air bag when the seat belt is unbuckled, whereby the air bag will not deploy in the event of a collision.

2. The air bag deployment circuit according to claim 1, wherein said buckle inhibiting means comprises a relay having a coil and a plurality of contacts, the coil connected in series between the seat belt buckle switch and ground, wherein the contacts of said relay open the circuit between the controller and the circuitry inflating the air bag when the seat belt is unbuckled, and close the circuit between the controller and the circuitry inflating the air bag when the seat belt is buckled.

3. The air bag deployment inhibitor circuit according to claim 2, further comprising a buckle indicator for providing the occupant of the vehicle seat with a visual signal indicating whether the air bag has been deactivated because the seat belt is unbuckled.

4. The air bag deployment inhibitor circuit according to claim 3, wherein the buckle indicator comprises a light bulb.

5. The air bag deployment inhibitor circuit according to claim 3, wherein the buckle indicator comprises a light emitting diode.

6. An air bag deployment inhibitor circuit for a motor vehicle having an ignition switch connected between a battery and a controller, a crash sensor connected to an evaluation circuit sending an electrical signal warning of a collision to the controller, circuitry inflating an air bag on receipt of a signal from the controller, a seat whose position is adjustable on a seat track, and a seat belt buckle switch having electrically closed contacts when the seat belt is unbuckled and open contacts when the seat belt is buckled, comprising:

a) a seat adjustment limit switch electrically connected between the controller and the circuitry inflating the air bag, wherein said limit switch opens when the seat position is adjusted forward of a predetermined distance along the seat track, whereby the air bag will not deploy in the event of a collision; and b) buckle inhibiting means for opening the circuit between the controller and the circuitry inflating the air bag when the seat belt is unbuckled, whereby the air bag will not deploy in the event of a collision.

7. The air bag deployment inhibitor circuit according to claim 6, wherein said buckle inhibiting means comprises a relay having a coil and a plurality of contacts, the coil connected in series between the seat belt buckle switch and ground, wherein the contacts of said relay open the circuit between the controller and the circuitry inflating the air bag when the seat belt is unbuckled, and close the circuit between the controller and the circuitry inflating the air bag when the seat belt is buckled.

8. The air bag deployment inhibitor circuit according to claim 7, further comprising a seat adjustment indicator for providing the occupant of the vehicle seat with a visual signal indicating whether the air bag has been deactivated because the seat position is forward of a predetermined distance along the seat track.

9. The air bag deployment inhibitor circuit according to claim 8, wherein said seat adjustment indicator comprises a light bulb.

10. The air bag deployment inhibitor circuit according to claim 8, wherein said seat adjustment indicator comprises a light emitting diode.

11. The air bag deployment inhibitor circuit according to claim 8, further comprising a buckle indicator for providing the occupant of the vehicle seat with a visual signal indicating whether the air bag has been deactivated because the seat belt is unbuckled.

12. The air bag deployment inhibitor circuit according to claim 11, wherein the buckle indicator comprises a light bulb.

13. The air bag deployment inhibitor circuit according to claim 11, wherein the buckle indicator comprises a light emitting diode.

* * * * *